(12) United States Patent
Van Berkel et al.

(10) Patent No.: US 11,013,241 B2
(45) Date of Patent: May 25, 2021

(54) SYSTEM FOR PROCESSING SLAUGHTERED PRODUCTS, AND METHOD FOR ADJUSTING A MUTUAL POSITIONING OF PRODUCT CARRIERS OF SUCH A SYSTEM

(71) Applicant: Marel Poultry B.V., AV Boxmeer (NL)

(72) Inventors: Franciscus Arnoldus Albertus Van Berkel, Av Boxmeer (NL); Rene Johannes Theodorus Janssen, AV Boxmeer (NL); Richard Jozef De Schutter, AV Boxmeer (NL)

(73) Assignee: Marel Poultry B.V., AV Boxmeer (NL)

( * ) Notice: Subject to any disclaimer, the term of this patent is extended or adjusted under 35 U.S.C. 154(b) by 0 days.

(21) Appl. No.: 17/050,717

(22) PCT Filed: Apr. 26, 2019

(86) PCT No.: PCT/NL2019/050246
§ 371 (c)(1),
(2) Date: Oct. 26, 2020

(87) PCT Pub. No.: WO2019/212335
PCT Pub. Date: Nov. 7, 2019

(65) Prior Publication Data
US 2021/0084915 A1  Mar. 25, 2021

(30) Foreign Application Priority Data

May 1, 2018  (NL) ...................................... 2020848

(51) Int. Cl.
*A22C 21/00* (2006.01)
*A22B 7/00* (2006.01)
(52) U.S. Cl.
CPC .......... *A22C 21/0053* (2013.01); *A22B 7/005* (2013.01)

(58) Field of Classification Search
CPC ........................... A22C 21/00; A22C 21/0053
(Continued)

(56) References Cited

U.S. PATENT DOCUMENTS

| 4,597,133 A | 7/1986 | van de Nieuwelaar |
| 4,756,056 A | 7/1988 | Innes et al. |

(Continued)

FOREIGN PATENT DOCUMENTS

| EP | 1205111 A1 | 5/2002 |
| ES | 2006845 A6 | 5/1989 |

OTHER PUBLICATIONS

International Search Report and Written Opinion issued in corresponding International Application No. PCT/NL2019/050246, dated Jul. 10, 2019 (10 pages).

*Primary Examiner* — Richard T Price, Jr.
(74) *Attorney, Agent, or Firm* — Osha Bergman Watanabe & Burton LLP (57) ABSTRACT

The invention relates to a system for processing slaughtered products, comprising a first and second circulating element and first and second product carriers cooperating with these, and a transmission device for coupling the first and second circulating elements for opposite rotation, wherein a slaughtered product is transferred from a first to a second product carrier at a transfer location, comprising a first and second gear wheel connected to the first and second circulating element, wherein the first gear wheel is coupled to the second gear wheel via a first and second transmission gear wheel for rotation, and a displacement device which is adapted to displace the centre of gravity of the first and/or second transmission gear wheel while maintaining the toothed engagement, in such a way that an angular position of the first gear wheel changes with respect to an angular position of the second gear wheel. The invention also relates (Continued)

to a method for positioning product carriers of such a system.

14 Claims, 4 Drawing Sheets

(58) Field of Classification Search
USPC .................................................. 452/177–182
See application file for complete search history.

(56) References Cited

U.S. PATENT DOCUMENTS

| | | | | |
|---|---|---|---|---|
| 5,277,650 | A * | 1/1994 | Meyn | A22C 21/06 452/117 |
| 5,672,098 | A * | 9/1997 | Veraart | A22C 21/0053 452/182 |
| 6,033,299 | A * | 3/2000 | Stone | A22C 21/0053 452/182 |
| 7,662,034 | B2 * | 2/2010 | Van Hillo | A22C 21/0023 452/167 |
| 2003/0134586 | A1 * | 7/2003 | Kvorning | A22C 21/0053 452/182 |
| 2011/0105001 | A1 * | 5/2011 | Van Den Nieuwelaar | A22C 21/0053 452/52 |

* cited by examiner

SYSTEM FOR PROCESSING SLAUGHTERED PRODUCTS, AND METHOD FOR ADJUSTING A MUTUAL POSITIONING OF PRODUCT CARRIERS OF SUCH A SYSTEM

With systems for processing slaughtered products, such as poultry, in particular chickens, there is a constant striving for higher processing speeds in order to thus be able to increase the production capacity. Such systems usually comprise a chain-like conveying member to which product carriers are attached, usually hooks, which carry the slaughtered products. The slaughtered products are in this case conveyed past processing stations in a continuous manner. Depending on the slaughtered product to be processed and the processing stage, specific product carriers are required to carry the slaughtered product in such a manner that it can be processed efficiently.

Such systems usually comprise transfer locations where slaughtered products are transferred, that is to say moved across, from a product carrier, such as a hook, on a first circulating element, such as a carousel, or optionally from a product carrier on a first conveyor chain which is fitted around such a first circulating element, to a product carrier, such as a hook, on a second conveyor chain, usually by means of hooks of a different type. This is a critical point with such a system. An insufficiently accurate mutual positioning of the product carriers during the transfer operation results in a higher error rate of the transfer of slaughtered products and consequently to a higher downtime of the system, for example as a result of a slaughtered product becoming jammed. In addition, this transfer is highly critical with an increased conveying speed or processing speed.

In practice, during use of such a system, inter alia the weight of the slaughtered products carried by the product carriers also varies, that is to say when processing different types of slaughtered product and also within a number of the same types of slaughtered product. This also results in a varying mutual positioning of product carriers at the location of a transfer location, inter alia because of the usually significant length of the conveying members, which may be several kilometres long. With regard to the problems mentioned above, the current systems can be improved.

Also with regard to the adjustment of the mutual positioning of product carriers at the location of a transfer location, the current systems can be improved. When it is found that the positioning is insufficiently accurate, for example due to finding that the failure rate of the transfer of slaughtered products is or becomes inacceptably high, the system has to be stopped in order then to change the settings of the system relating to the positioning. Subsequently, the system has to be started again and only then is it possible to check if the changed settings have a favourable effect on the positioning and thus on the failure rate. If not, the system has to be stopped again, etc. This iterative process is particularly time-consuming and laborious. It leads to an undesirably high downtime of the system.

It is therefore an object of the present invention to provide a system for processing slaughtered products, in particular poultry, which offers a solution to one or more of the abovementioned problems. It is an object of the invention to provide a system for processing slaughtered products which is able to operate at a higher processing speed while maintaining its reliability. It is an object of the invention to provide a system for processing slaughtered products which is able to transfer slaughtered products in a more reliable manner. It is an object of the invention to provide a system for processing slaughtered products in which the transfer of slaughtered products between product carriers is to a great degree unaffected by the properties of slaughtered products which vary during operation.

One or more of the abovementioned objects are achieved by the system according to the present invention for processing slaughtered products, in particular poultry such as chickens, as defined in Claim 1, the system comprising a first circulating element which rotates about a first central axis during operation of the system, first product carriers which cooperate with the first circulating element to bring about joint rotation, each configured to carry a respective one of the slaughtered products, a second circulating element which, during operation, rotates about a second central axis, which is parallel and spaced apart from the first central axis, and second product carriers which cooperate with the second circulating element for joint rotation, each configured to carry a respective one of the slaughtered products.

According to the invention, the system comprises a transmission device which is configured for coupling the first and second circulating element to each other using a fixed transmission ratio, such as for example using a gear wheel transmission or using a geared-belt transmission, in such a way that upon rotation of the first circulating element in a direction of rotation, the second circulating element rotates in the opposite direction of rotation, and in such a way that during said rotation in each case a first product carrier and a second product carrier pass a transfer location at the same time interval with respect to each other, which transfer location is preferably situated between the first and second circulating element. In this case, the system is configured to transfer a slaughtered product from a first product carrier to a second product carrier (and/or vice versa) during said rotation at the location of the transfer location. The transmission device comprises a first gear wheel and a second gear wheel connected to the first and the second circulating element, respectively, for rotation. Furthermore, the transmission device comprises a first transmission gear wheel and a second transmission gear wheel which is in toothed engagement with the first transmission gear wheel. The first gear wheel is coupled to the second gear wheel via the first and second transmission gear wheel for rotation. The transmission device furthermore comprises a displacement device which is adapted to displace the centre of gravity of at least one of the first transmission gear wheel and the second transmission gear wheel while maintaining the toothed engagement (that is to say between the first transmission gear wheel and the second transmission gear wheel), in such a way that an angular position of the first gear wheel changes with respect to an angular position of the second gear wheel in order thus, as a result thereof, to change a mutual positioning, or alignment, of a first product carrier —of the first product carriers —with respect to a second product carrier —of the second product carriers—at the location of the transfer location.

Normally, the centre of gravity of a gear wheel is situated on the central axis of the gear wheel and therefore the expression centre of gravity in the present description and claims is understood to mean a point on the central axis. Thus, such a displacement of the centre of gravity is understood to mean a displacement of at least one of the first transmission gear wheel and the second transmission gear wheel other than a pure angular displacement, or pure rotation, of the respective gear wheel about its central axis, since the centre of gravity, or a point on the central axis, is not displaced in the case of such an angular displacement. During said displacement, the respective gear wheel thus experiences a translation along a path which is straight, such as for example parallel to the central axis, or (partly) curved.

An advantage of the system according to the present invention is the fact that by using said transmission device, the mutual positioning, or alignment, of a first product carrier and a second product carrier at the location of the transfer location can be adjusted with a great degree of accuracy, since the angular position of the first gear wheel with respect to that of the second gear wheel, and thus also of the circulating elements with which the product carriers cooperate for joint rotation can be changed in an efficient and accurate way and, in addition, are coupled via the transmission device via a fixed transmission ratio. This leads to a more reliable transfer of slaughtered products, at a lower failure rate even at higher processing speeds. The risk of a completely incorrect transfer in which a slaughtered product is not transferred to a second product carrier at all, but drops out of the system, and also the risk of so-called one-leggers, that is to say slaughtered products with two legs, such as poultry, which, during transfer from a first to a second product carrier, inadvertently end up with only one leg in the second product carrier, both risks being a possible result of an insufficiently accurate alignment, may be reduced by using the system according to the invention.

In addition, the transmission device makes it possible to change the mutual positioning during operation of the system, that is to say while the circulating elements are rotating and thus successive first product carriers and second product carriers pass the transfer location. This is possible because the transmission gear wheels remain in toothed engagement during the displacement of at least one gear wheel thereof and can thus remain in operation, that is to say can remain rotatably drivable. A significant advantage is therefore that the effect of changing the positioning on the transfer can be detected immediately while it is taking place, as a result of which it is possible to achieve a more accurate and thus more reliable transfer of slaughtered products in a very short time. In addition, tolerances, such as for example in conveying members, often only become really visible in practice during operation, in particular with conveying members having a length in the order of several kilometres. Such tolerances, which inter alia lead to an insufficiently accurate alignment, during standstill of the system are thus generally not identical to the tolerances at operating speed of the system. In addition, the weight of the slaughtered products carried by a conveying member has an effect thereon. As a result of the fact that, with the system according to the invention, the alignment can be modified while it is in operation, there is thus no drawback of such effects on the tolerances. In this context, it is also possible to allow the adjustment, that is to say the modification of the angular position between the two circulating elements, to take place in a completely automated manner, for example using a detection device suitable for the purpose which is operatively connected to the transmission device and/or on the basis of information stored in a control device of the system which is operatively connected to the displacement device, such as information related to a weight of the slaughtered products.

With regard to the mutual positioning, or alignment, of a first product carrier and a second product carrier at the location of the transfer location, it should be noted that this may also be dependent on the way in which slaughtered products are transferred from a first to a second product carrier, such as for example comprising the distance which a slaughtered product has to travel while being transferred from a first to a second product carrier. If for example a slaughtered product is forced from the first product carrier substantially at right angles to the direction of displacement of the first and second product carriers at the location of the transfer location, it may be advantageous, in particular with high conveying speeds, to allow the second product carrier to trail slightly in order thus to compensate for the time it takes the slaughtered product to be moved from the first to the second product carrier.

The angular position of a gear wheel means the position of the gear wheel about the central axis thereof. A rotation of the gear wheel, or an angular displacement, thus results in a modified angular position.

In a preferred embodiment, the first product carriers are attached to the first circulating element at a regular distance apart in the peripheral direction. In an embodiment, the first circulating element may comprise a carousel. The system may furthermore comprise an endless flexible conveying member on which the second product carriers are provided at a regular distance apart and which flexible conveying member is fitted around the second circulating element. The endless flexible conveying member may comprise a linked chain and the second circulating element may comprise a chain wheel. With such a system, slaughtered products can thus be transferred from product carriers of a circulating element, such as a carousel, to product carriers on a flexible conveying member. Transferring slaughtered products from such product carriers, which have a position which is determined to a great degree and can keep slaughtered products stable, increases the reliability.

In an alternative preferred embodiment, the system comprises a first endless flexible conveying member, on which the first product carriers are provided at a regular distance apart and which is fitted around the first circulating element, and/or a second endless flexible conveying member, on which the second product carriers are provided at a regular distance apart and which is fitted around the second circulating element. The first and/or second endless flexible conveying member may comprise a linked chain. The first and/or second circulating element may comprise a respective chain wheel.

Preferably, the first gear wheel and the second gear wheel each have a central axis which coincides with the first and the second central axis, respectively. Alternatively, it is possible for the first gear wheel and the second gear wheel to be connected to the first and second circulating element, respectively, via further gear wheels or at least transmission devices, for rotation.

In a preferred embodiment, the first transmission gear wheel is provided with inclined toothing and is rotatable about a third central axis, and the second transmission gear wheel is also provided with inclined toothing, is in toothed engagement with the inclined toothing of the first transmission gear wheel, and is rotatable about a fourth central axis. In this case, the displacement device of the transmission device may be configured to displace one of the first and second transmission gear wheel with respect to the other of the first and second transmission gear wheel parallel to the central axis thereof while maintaining the (toothed) engagement between the first and second transmission gear wheel. In this case, it is possible for one of the two transmission gear wheels or both transmission gear wheels to undergo the displacement. As a result of this axial relative displacement, the angular position between the two transmission gear wheels changes, due to the inclined toothing, in a very controlled and defined manner. The more inclined the toothing is, the greater the change in angular position. The displacement may be carried out during operation of the system, that is to say when the gear wheels are being rotatably driven, without causing any problems.

In this case, the transmission device may furthermore comprise a third transmission gear wheel which is rotatable about the third central axis, is non-rotatably connected to the first transmission gear wheel and is coupled to the first gear wheel at a fixed transmission ratio. Furthermore, the transmission device may comprise a fourth transmission gear wheel which is rotatable about the fourth central axis, is non-rotatably connected to the second transmission gear wheel and is coupled to the second gear wheel at a fixed transmission ratio. In this case, the displacement device may be configured to displace the first and third transmission gear wheels parallel to the third central axis and/or to displace the second and fourth transmission gear wheels parallel to the fourth central axis. Alternatively, the displacement device may be configured to displace the first transmission gear wheel parallel to the third central axis with respect to the third transmission gear wheel and/or to displace the second transmission gear wheel parallel to the fourth central axis with respect to the fourth transmission gear wheel. The third transmission gear wheel may be in toothed engagement with the first gear wheel. The fourth transmission gear wheel may be in toothed engagement with the second gear wheel. As a result thereof, the displacement of the first and/or second transmission gear wheels may, as it were, be isolated from the remainder of the transmission device.

Preferably, the first, second, third and fourth central axes all extend parallel to each other.

In an alternative preferred embodiment of a system according to the present invention, the first transmission gear wheel is rotatable about a third central axis and the second transmission gear wheel is rotatable about a fourth central axis which runs parallel and at a distance from the third central axis. In this case, the displacement device of the transmission device may be configured to displace the first and the second transmission gear wheels with respect to each other in a plane at right angles to the third and fourth central axes while maintaining engagement between the first and the second transmission gear wheels.

In this case, the transmission device may be configured in such a way that the first transmission gear wheel follows a circular path with a constant first radius around a central axis during said displacement, which may be the first central axis, of the first gear wheel and thus unrolls around the first gear wheel, and the second transmission gear wheel follows a circular path with a constant second radius around a central axis during said displacement, which may be the second central axis, of the second gear wheel and thus unrolls around the second gear wheel.

The first product carriers may be of the same type as or, preferably, of a different type than the second product carriers. In an embodiment, the first product carriers and/or the second product carriers are designed as hooks in order to carry slaughtered products therefrom in a suspended fashion. In an embodiment, the first product carriers are designed as slaughter hooks and the second product carriers are designed as cooling hooks. Alternatively, the first product carriers may be designed, for example, as cooling hooks. Alternatively, the second product carriers may be designed, for example, as portion hooks.

The transfer location may be situated between the first circulating element and the second circulating element, that is to say at a location where the first and second product carriers are along a periphery of the respective circulating element. Alternatively, the transfer location may be situated, for example, at a location which is adjacent to one of the first and second circulating elements, that is to say where the first or second product carriers are situated along a periphery of the respective one circulating element, but is clear from the other of the first and second circulating elements, that is to say where the first or second product carriers are not situated along a periphery of the respective other circulating element, but, for example, in case of an endless flexible conveying member such as a chain, along a straight track section between the respective other circulating element and a further circulating element, but in the vicinity of the respective other circulating element, such as within a distance in the range of up to 50 metres from the other circulating element, preferably within a distance of 5 to 40 metres, more preferably a few tens of metres, such as for example 20 metres, from the respective other circulating element.

In order to allow a slaughtered product to be transferred from a first product carrier to a second product carrier, the system may comprise a transfer means which is configured to allow a slaughtered product to be transferred at the location of the transfer location, during said rotation, from a first product carrier to a second product carrier, preferably by means of a transfer element of the transfer means exerting a force on the slaughtered product, such as by pushing or striking against the slaughtered product.

Furthermore, the system may comprise a drive device for effecting rotation about the respective central axis of the first and/or the second circulating element. The drive device may comprise a drive means, such as an electrical means, for example an electric motor, for rotatably driving the first circulating element. The drive device may comprise a further drive means, such as an electrical means, for example an electric motor, for rotatably driving the second circulating element. In this case, it is advantageous to control a rotary speed of the one circulating element using one of the drive means, which corresponds to a displacement speed of the product carriers, and to generate a predetermined drive torque using the other of the two drive means and thus not use it to control rotary speed. When using a first and/or second endless flexible conveying member, such as a conveyor chain, the drive torque is linked to the pulling power/tension in the conveying member or the conveying members. Also, said drive torque is linked to a torque to which the first and second transmission gear wheels of the transmission device are subjected during operation. Preferably, the drive which drives the second circulating element is controlled in such a way that it generates a predetermined drive torque.

The present invention also relates to a method for adjusting a mutual positioning of product carriers of a system according to the present invention, the method comprising displacing the centre of gravity of at least one of the first transmission gear wheel and the second transmission gear wheel using the displacement device while maintaining the toothed engagement, in such a way that an angular position of the first gear wheel with respect to an angular position of the second gear wheel changes. As a result thereof, a mutual positioning, or alignment, of a first product carrier —of the first product carriers —with respect to a second product carrier —of the second product carriers —is thus changed at the location of the transfer location.

In an embodiment, the first and the second circulating elements are rotated and a mutual positioning of a first and a second product carrier is detected. This may occur directly, or indirectly, for example via detecting an angular position of respectively the first and second circulating elements or first and second gear wheels. If the detected mutual positioning is outside a predetermined range, the displacement step is carried out during rotation in order for the mutual positioning to fall within the predetermined range again.

In addition or alternatively to the abovementioned detection, in an embodiment of the method, the displacement step is carried out on the basis of information which is present in a control device of the system, such as comprising information about a load being applied to a circulating element and/or conveying member during operation of the system, for example as a result of the weight of slaughtered products to be processed. In an embodiment of the method, the displacement step may therefore (partly) be carried out on the basis of a weight of the slaughtered products which is preferably input manually or on the basis of a weight measurement in the system in a control device of the system. A relationship between the mutual positioning and the weight of the slaughtered products may be determined, and optionally be input in a memory of the control device, and on the basis thereof, the displacement step may be carried out manually or in an automated fashion in order to (at least partly) compensate for the weight of the slaughtered products, for example if relatively heavy slaughtered products are being processed after the processing of relatively light slaughtered products. As has already been indicated above, the weight of the slaughtered products, in particular when using long endless flexible conveying members, may affect the mutual positioning of the first and second product carriers at the location of the transfer location, also with regard to the above-described possible trailing of the second product carriers in order to compensate for the time it takes for a slaughtered product to transfer from a first to a second product carrier, depending on the conveying speed. In this way, it is thus possible, for example, to already carry out a preliminary setting of the mutual positioning in case of a change in slaughtered products to be processed. If required, it is then possible, based on said detection, to perform a readjustment either manually or in an automated fashion, if it is found that the alignment is (only just) not yet within the desired range.

Advantages of the method according to the invention are analogous to the abovementioned advantages of the system according to the invention. Preferred embodiments of the system according to the invention, as described above, are analogously usable with the method according to the invention, and vice versa.

The present invention will be described below by means of the description of a preferred embodiment of a system according to the present invention, with reference to the following diagrammatic figures, in which.

Figure 1:
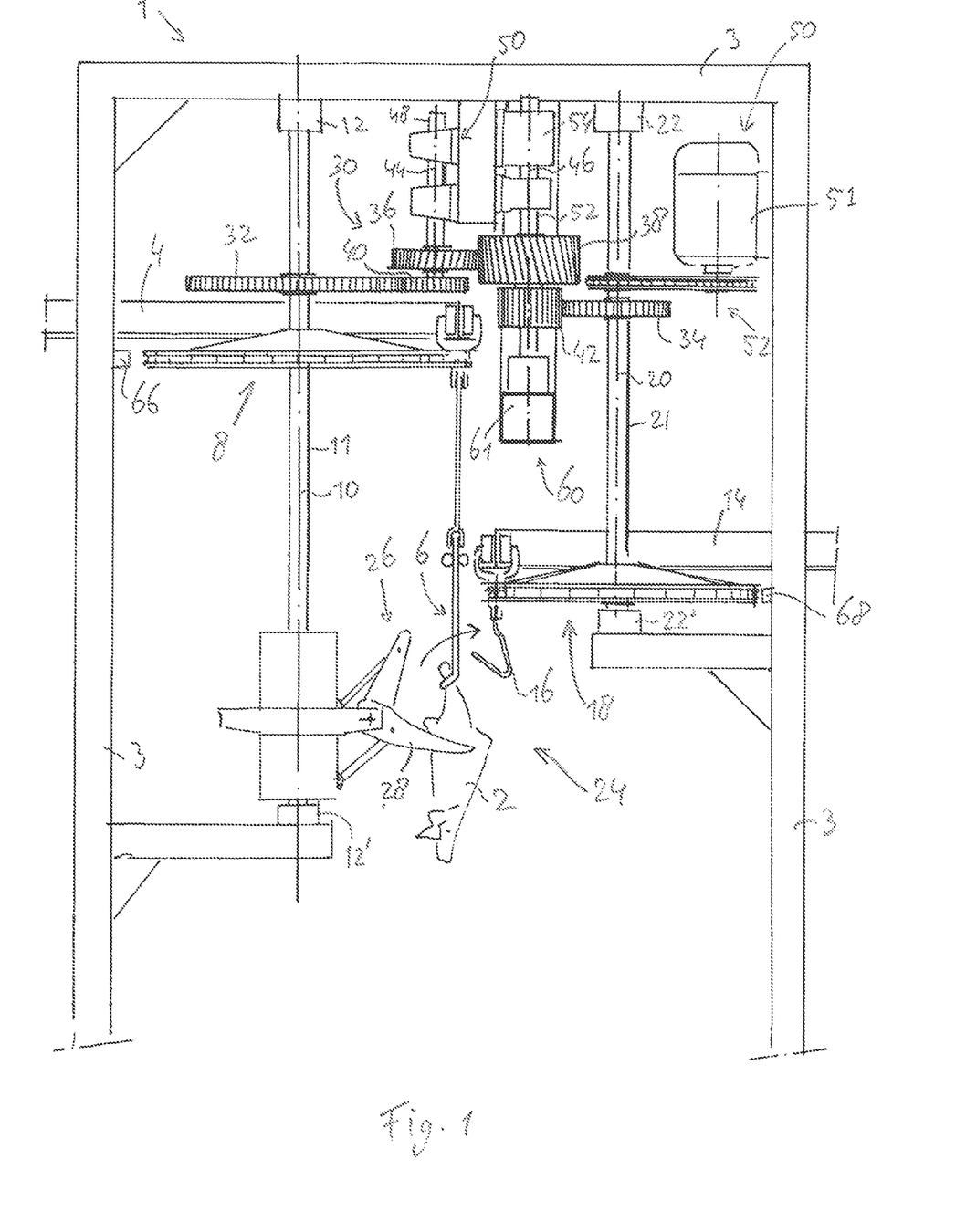
FIG. 1 shows a front view of a portion of a preferred exemplary embodiment of a system according to the present invention, for processing slaughtered products.

FIG. 1 shows a portion of a system 1 for processing slaughtered products, such as poultry such as chickens or parts thereof. By way of example, FIG. 1 shows a slaughtered product 2, being a part of a chicken. The system 1 has a first endless flexible conveying member 4 in the form of a linked chain. On the conveying member 4 successive product carriers 6 in the form of hooks are provided at a regular intermediate distance, such as a distance in the range of 10 to 20 cm, each of which carries a slaughtered product 2 in a suspended manner. FIG. 1 shows one product carrier 6. The vertical distance between the product carrier 6 and the conveying member 4 may also be selected to be smaller. By means of a drive device (not shown in any more detail in the figures), such as comprising an electric motor, the conveying member 4 or a component of the system, such as a chain wheel, which is operatively connected thereto, may be driven in such a way that the hooks carrying the slaughtered products 2 are displaced along a conveying path in order to process the slaughtered products. Various processing stations are usually arranged along the conveying path for performing processing steps on the slaughtered products while these are continuously being displaced along the processing station. These include, for example, cooling, eviscerating, various cutting operations of slaughtered products.

The system 1 furthermore has a first circulating element 8 which rotates about a first central axis 10 during operation of the system 1. The circulating element 8 is provided on an axle 11, which is rotatably attached to a frame 3 of the system 1 via a bearing 12, 12'. In the example from FIG. 1, the first circulating element 8 is a chain wheel on which a toothing is provided along its periphery for cooperating with the conveying member 4 which is designed as a linked chain. The conveying member 4 is fitted around the first circulating element 8. As a result thereof, the first product carriers 6 thus cooperate with the first circulating element 8 for joint rotation. A guide device may guide the first product carriers in a track which is adapted to the first circulating element in order to improve the positioning accuracy of the first product carriers.

The system 1 also has a second endless flexible conveying member 14, likewise in the form of a linked chain. Successive second product carriers 16 in the form of hooks are provided on the conveying member 14 at a regular distance apart on which a slaughtered product 2 may be suspended. These second product carriers 16 are of a different type from the first product carriers 6. The product carriers 16 may, for example, be so-called cooling hooks and the product carriers 6 may be slaughter hooks. However, in the context of the invention, it is also possible for product carriers 6 and 16 to be of the same type.

The system 1 furthermore has a second circulating element 18 which, during operation of the system 1, rotates about a second central axis 20 which runs parallel and at a distance from the first central axis 10. The circulating element 18 is provided on an axle 21 which is rotatably attached to a frame 3 of the system 1 via a bearing 22, 22', at a fixed distance from the axle 11 of the first circulating element 8. In the example from FIG. 1, the second circulating element 18 is a chain wheel on the periphery of which a toothing is provided which cooperates with the conveying member 14 designed as a linked chain, analogously to circulating element 8. The conveying member 14 is fitted around the second circulating element 18. As a result thereof, the second product carriers 16 thus cooperate with the second circulating element 18 for joint rotation. The two circulating elements 8, 18 are provided at a distance from each other in such a way that the product carriers 6, 16 come together between the circulating elements 8, 18, at the location of a transfer location 24, that is to say are at the shortest distance apart. This distance is such that a slaughtered product 2 can be transferred from a first product carrier 6 to a second product carrier 16 in an automated manner.

In order to enable a slaughtered product 2 to be transferred from a first product carrier 6 to a second product carrier 16, the system 1 has a transfer means 26 which is shown in highly diagrammatic form in FIG. 1 and which is configured for transferring a slaughtered product 2 from a first product carrier 6 to a second product carrier 16 at the location of the transfer location 24, during rotation of the two circulating elements 8, 18, in each case in an automated manner. In an embodiment, this may be achieved by means of a transfer element 28 of the transfer means 26 exerting a force on the slaughtered product 2. A drive of the transfer means 26 may be provided, for example via a cam follower, in order thus to allow a movement of the transfer means to take place in a manner adapted to the rotation of the first circulating element 8. Such a transfer of slaughtered products is known per se to those skilled in the art.

The system furthermore has a drive device 50 for rotatably driving the second circulating element 18. To this end, by way of example, an electric motor 51 is provided which is connected to the axle 21 in a driving manner via a geared-belt transmission 52. The two circulating elements 8, 18 are driven in such a way, directly or indirectly via the conveying member 4 or 14, respectively, which is fitted around them, that between 15000 and 20000 slaughtered products are transferred per hour. Incidentally, in the context of the invention, lower or higher so-called line speeds are also possible, such as for example a line speed in the range of 5000 to 15000. The first circulating element 8 may be driven analogously by means of an electric motor associated with the drive device.

The system 1 according to the invention furthermore has a transmission device 30 which is configured for coupling the first and second circulating elements 8, 18 to each other using a fixed transmission ratio, by means of a gear wheel transmission. This coupling is in addition such that upon rotation of the first circulating element 8 in a direction of rotation, such as in a clockwise direction, the second circulating element 18 rotates in the opposite direction of rotation, i.e. counter-clockwise, and in such a way that during said rotation in each case a first product carrier 6 and a second product carrier 16 pass the transfer location 24 situated between the first and second circulating element 8, 18 at the same time interval with respect to each other. In the view from FIG. 1, at the location of the transfer location 24, the product carriers 6, 16 thus move out of the plane of the paper towards the viewer. As FIG. 1 shows, at least in the present example, an effective diameter of the second circulating element 18 is smaller than an effective diameter of the first circulating element 8. In order to achieve said same time interval, the second circulating element 18 will therefore rotate at a higher rotary speed and/or the intermediate distance between successive product carriers 16 will be smaller than that between successive product carriers 6. Other ratios, for example between diameters of circulating elements, distances between successive first or second product carriers, and processing speeds are also possible within the context of the invention.

The transmission device 30 has a first gear wheel 32 and a second gear wheel 34, which are connected for rotation to the first 8 and the second circulating element 18, respectively. To this end, the first gear wheel 32 is provided on the axle 11 so as to be rotatable about central axis 10, fixedly connected to the first circulating element 8 for rotation. To this end, the second gear wheel 34 is provided on the axle 21 so as to be rotatable about central axis 20, fixedly connected to the second circulating element 18 for rotation. Alternatively, the first and/or second gear wheel may be connected to the first and second circulating element, respectively, via a further transmission, such as via further gear wheels.

The transmission device 30 furthermore has a first transmission gear wheel 36 and a second transmission gear wheel 38 which is in toothed engagement with the first transmission gear wheel 36. The first transmission gear wheel 36 is provided with inclined toothing 37 and is rotatable about a third central axis 44. See also FIG. 2. The second transmission gear wheel 38 is likewise provided with inclined toothing 39, in toothed engagement with the inclined toothing 37 of the first transmission gear wheel 36, and rotatable about a fourth central axis 46. The first 10, second 20, third 44 and fourth 46 central axes all extend parallel to each other.

Figure 2:
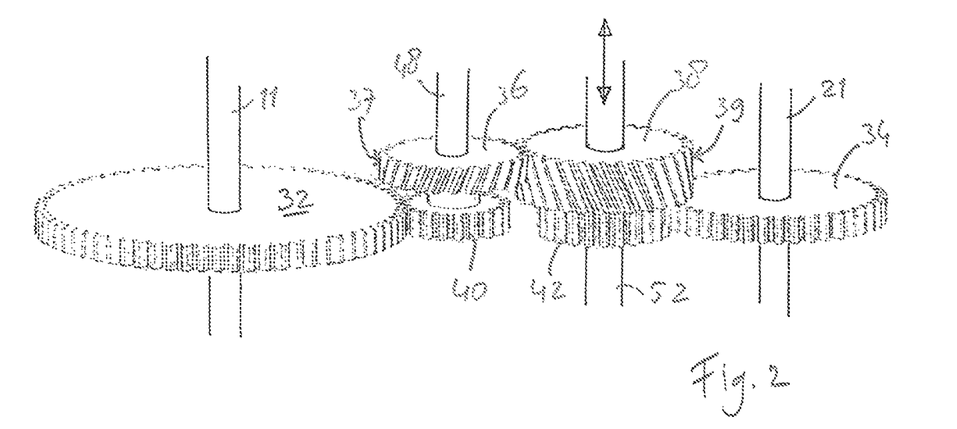
FIG. 2 shows a highly diagrammatic 3D view of a portion of a transmission device of a system according to the present invention.

For rotation, the first gear wheel 32 is coupled to the second gear wheel 34 via the first 36 and second 38 transmission gear wheel. To this end, the transmission device 30 furthermore has a third transmission gear wheel 40 which is rotatable about the third central axis 44, is connected non-rotatably to the first transmission gear wheel 36 and is coupled to the first gear wheel 32 at a fixed transmission ratio. The first 36 and third 40 transmission gear wheels are fitted to a joint axle 48 which is attached to the frame 3 via a bearing 50. The transmission device 30 furthermore has a fourth transmission gear wheel 42 which is rotatable about the fourth central axis 46, is connected non-rotatably to the second transmission gear wheel 38 and is coupled to the second gear wheel 34 at a fixed transmission ratio. For rotation, the second 38 and fourth 42 transmission gear wheels are coupled to each other so as to be rotatable about a joint axle 52 which is attached to the frame 3 via a support 54.

The transmission device 30 also has a displacement device 60 which is configured to displace the second 38 and fourth 42 transmission gear wheels parallel to the fourth central axis 46 while maintaining toothed engagement, as a result of which the centre of gravity of the second transmission gear wheel 38, and also that of the fourth transmission gear wheel 42, are thus displaced. In an embodiment, the second and fourth transmission gear wheels may be provided on a joint hollow axle through which the axle 52, mounted in bearings, extends, wherein the hollow axle is able to slide axially over the axle 52. Due to the fact that, as FIGS. 1, 2, 3a and 3b show, a thickness of the second 38 and fourth 42 transmission gear wheels is chosen to be greater than a thickness of the first transmission gear wheel 36 and the second gear wheel 34, the second transmission gear wheel 38 remains in engagement with the first transmission gear wheel 36 and the fourth transmission gear wheel 42 remains in engagement with the second gear wheel 34 during displacement. The thicknesses of the gear wheels are chosen in such a way that a predetermined maximum displacement can be achieved while maintaining toothed engagement. Said displacement may be achieved, for example, by providing a spindle drive 61 by means of which the assembly of second 38 and fourth 42 transmission gear wheels can be displaced manually or, preferably effectively in an automated manner and accurately vertically, that is to say parallel to the central axis 46. Other ways to achieve this vertical displacement are also possible in the context of the invention, such as for example by means of a cam follower mechanism or a linear drive using a spindle, or hydraulically or pneumatically using, for example, a piston/cylinder assembly.

Figure 3A:
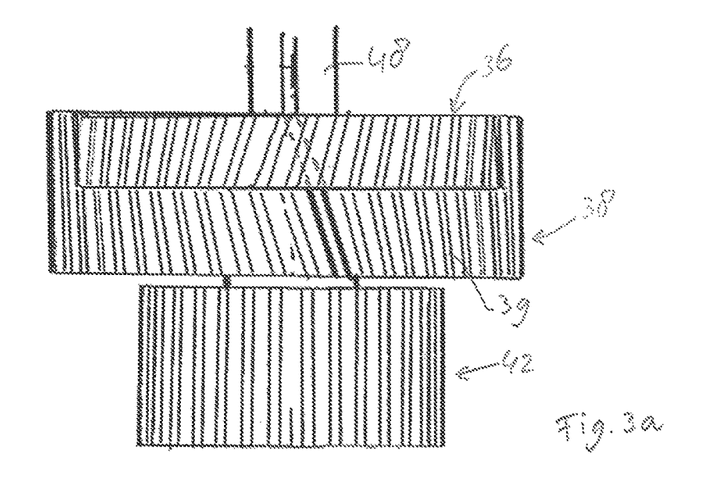
FIGS. 3a and 3b show a left-hand side view of a portion of a transmission device of the system shown in FIG. 1, in two different positions.
Figure 3B:
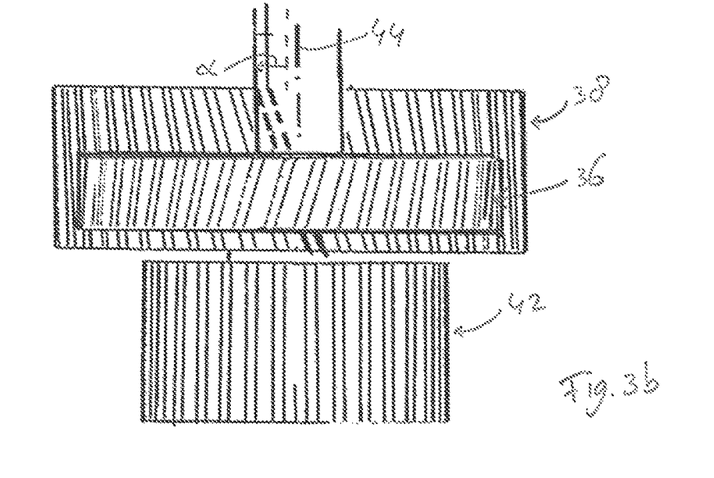

As a result of the displacement of the second transmission gear wheel 38 and because of the inclined toothing of the first 36 and second 38 transmission gear wheels, an angular position of the first gear wheel 32 with respect to an angular position of the second gear wheel 34 changes. This effect is illustrated in FIGS. 3a and 3b. When second transmission gear wheel 38 is moved upwards, parallel to the central axis 44, with respect to first transmission gear wheel 36, second transmission gear wheel 38 is subjected to an angular rotation a with respect to first transmission gear wheel 36 as a result of the engaged inclined toothings being displaced with respect to each other. That is to say, the angular position of second transmission gear wheel 38 changes with respect to first transmission gear wheel 36 by an angle α. As a result thereof, the angular position of the second gear wheel 34 with respect to the first gear wheel 32 thus also changes and the same is true for the second circulating element 18 with respect to the first circulating element 8 and the second 16 and first 6 product carriers, respectively, cooperating therewith for joint rotation. In this case, the degree of the change in angular position of the circulating element 18 with respect to the circulating element 8 depends on the transmission ratios between the different gear wheels. That is to say, a change in the angular position between the circulating elements 8, 18 may be smaller than, equal to or greater than said angle α.

Figures 5A, 5B:
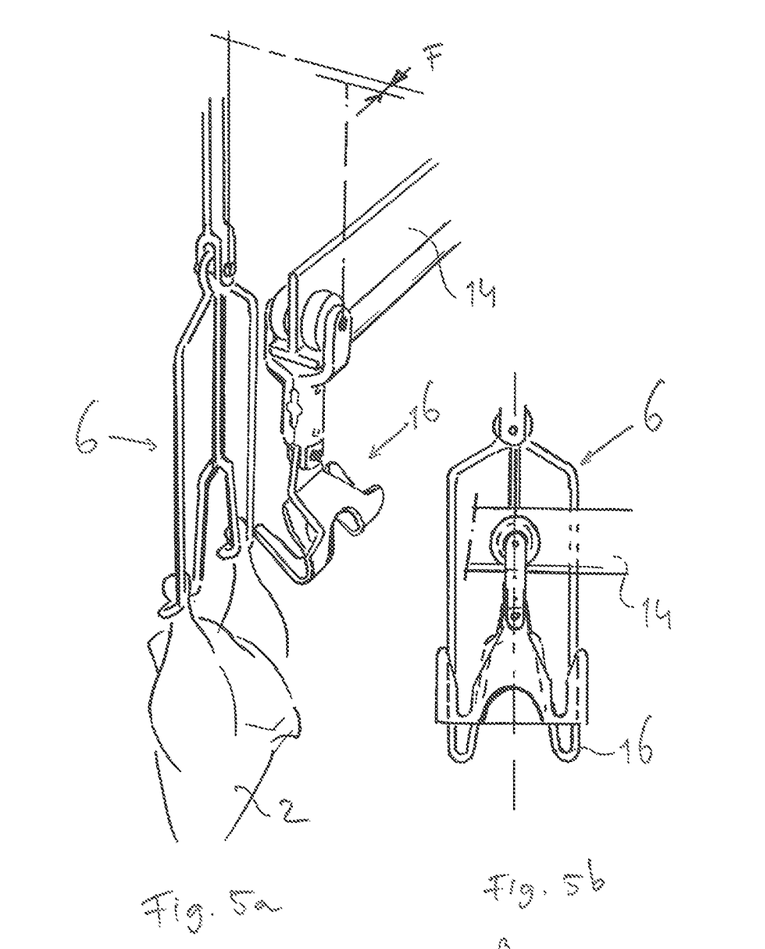
FIGS. 5a and 5b show a 3D view and right-hand side view, respectively, of a detail of the system shown in FIG. 1.

An alignment error, or incorrect timing, which may undesirably be present in the system 1, between the two product carriers 6, 16, denoted in FIG. 5a by the letter "F" (where "F" is thus dependent on a), as a result of which slaughtered products may possibly not, or at least not with a sufficient degree of operational reliability, be transferred, may thus be corrected by an above-described displacement of the second 38 and fourth 42 transmission gear wheels to result in a situation in which no, or at least a reduced, alignment error is present, as FIG. 5b shows. In an embodiment of the system, an alignment difference may deliberately be pursued, such as linked to the abovementioned trailing of the second product carriers in connection with, inter alia, the time required for the transfer versus the conveying speed of the product carriers. Due to the fact that this displacement is carried out while maintaining toothed engagement, it can be effected without difficulty during operation of the system 1, that is to say during rotation of all said gear wheels 32, 34, 36, 38, 40, 42 and the first 8 and second 18 circulating elements and during processing of slaughtered products, such as are successively transferred from first product carriers 6 to second product carriers 16. This displacement of the second 38 and fourth 42 transmission gear wheels may take place manually, that is to say by manually activating or de-activating displacement device 60. This displacement may also be carried out in an automated manner, such as by using a detection device which is operatively connected to the transmission device 30, more specifically to the displacement device 60 thereof, for automated adjustment, that is to say change of the angular position of the two circulating elements. The detection device may, for example, comprise a first detector 66, such as for example an optical or inductive sensor, for detecting the angular position of the first circulating element 16, and a second detector 68, such as for example again an optical or inductive sensor, for detecting the angular position of the second circulating element 18. This displacement may take place in addition to said detecting or alternatively thereto in an automated manner, on the basis of information stored in a control device of the system which is operatively connected to the displacement device, such as information relating to the weight of the slaughtered products, as has been explained above.

Incidentally, in the context of the invention, it is also possible for the first 32 and second 34 gear wheels not to be fitted to the same axle 11 and 21, respectively, but these may also be provided on a different axle and then be operatively connected to the axle 11, 21 via a fixed transmission ratio, such as via one or more further gear wheels.

Figure 4:
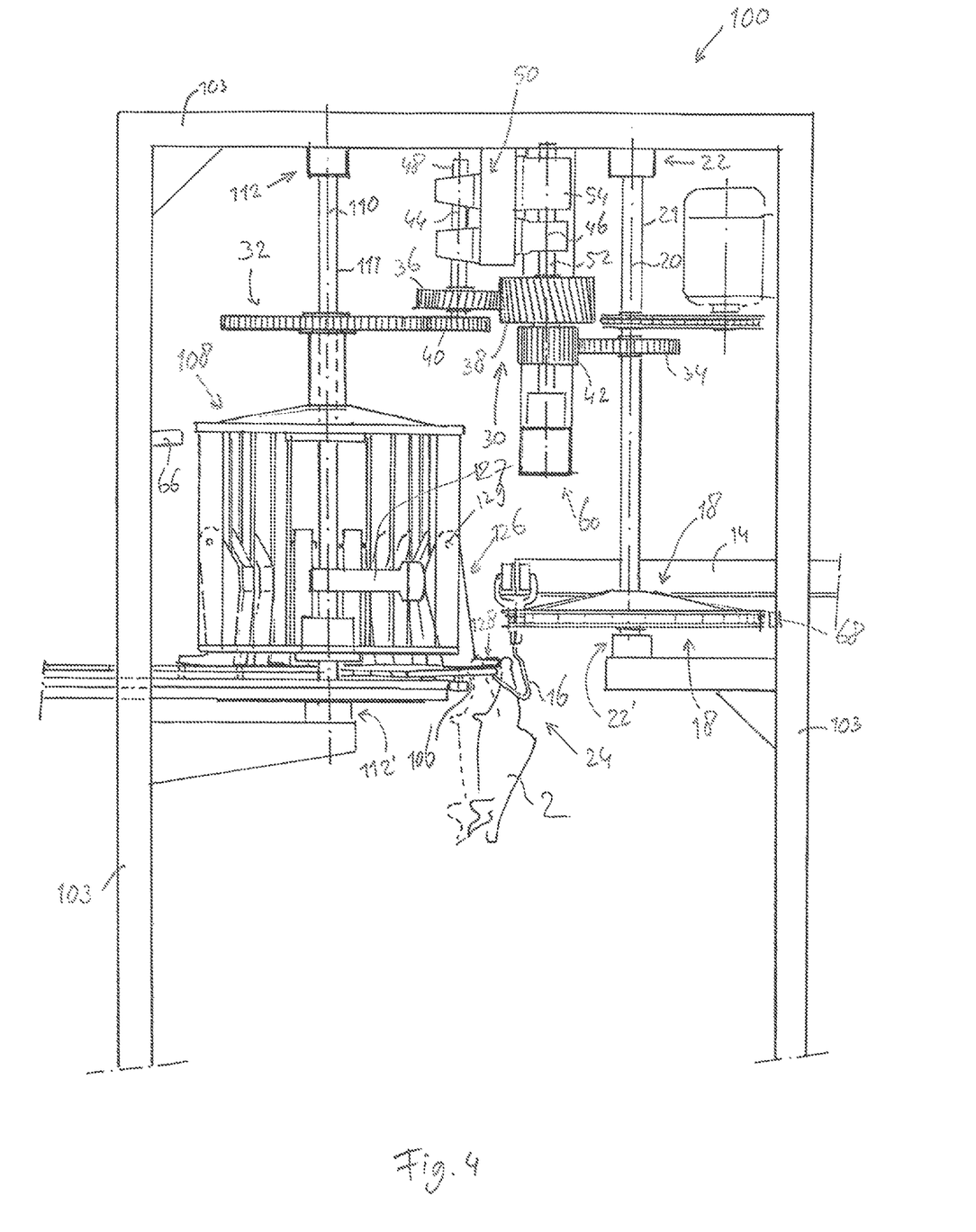
FIG. 4 shows a front view of a portion of a further preferred exemplary embodiment of a system according to the present invention, for processing slaughtered products.

FIG. 4 shows a portion of a further system 100 for processing slaughtered products, such as poultry or parts thereof. System 100 is identical to the above-described system 1 in so far as the transmission device 30 and the second circulating element 18 with the components cooperating therewith are concerned. Corresponding components have therefore been denoted by the same reference numeral. For components which differ but have the same or a similar function, 100 has been added to the corresponding reference numeral from FIG. 1 in FIG. 4.

The system 100 has a first circulating element 108 which rotates about a first central axis 110 during operation of the system 100. The circulating element 108 provided on an axle 111 which is rotatably attached to a frame 103 of the system 100 via a bearing 112, 112'. In the example from FIG. 4, contrary to system 1, the first circulating element 108 consists of a carousel on which first product carriers 106 are provided along the periphery thereof, at a regular distance apart. These product carriers 106 are panel-shaped and have a recess or recesses at a free end in which a part, or parts, of the slaughtered product may be provided in order for the slaughtered products to be carried by product carriers 106. This may be, for example, chickens which are hung in the recesses by the drumstick at the location of the ankle, as is illustrated in FIG. 4. During operation, slaughtered products may be transferred, for example from a conveyor chain to the product carriers 106, following which these, optionally after a processing on the carousel, are transferred to the second product carriers 16.

The system 100 is provided with a number of transfer means 126 on the carousel, one for each product carrier 106. Each of the transfer means is provided on the carousel so as to be pivotable about a pivot pin 129 and has a transfer element 128 in the form of a protruding portion which is provided just above the product carriers 106. The system has a plunger 127 which is situated inside the carousel and by means of which a transfer means which is situated at the location of the transfer location 24 can be pivoted outwards in such a way that the slaughtered product is transferred from the product carrier 106 to the product carrier 16 on account of a force exerted by the transfer element 128 on the slaughtered product, in the present example an outwardly directed force on the ankle joints of the chicken, as FIG. 4 shows. The plunger 127 may be cam-driven in order thus to be geared to the rotation of the carousel.

Further preferred embodiments of a system according to the present invention may, as regards configuration of the first circulating element 8, 108 and second circulating element 18, 118 and above-described components cooperating therewith, such as product carriers, conveying members and transfer means, be identical to the above-described systems 1, 100 according to the present invention, that is at least as regards the principle thereof. However, a transmission device 230 may be designed according to another principle than that of transmission device 30. This other principle is shown in a highly diagrammatic form in FIG. 6.

Figure 6:
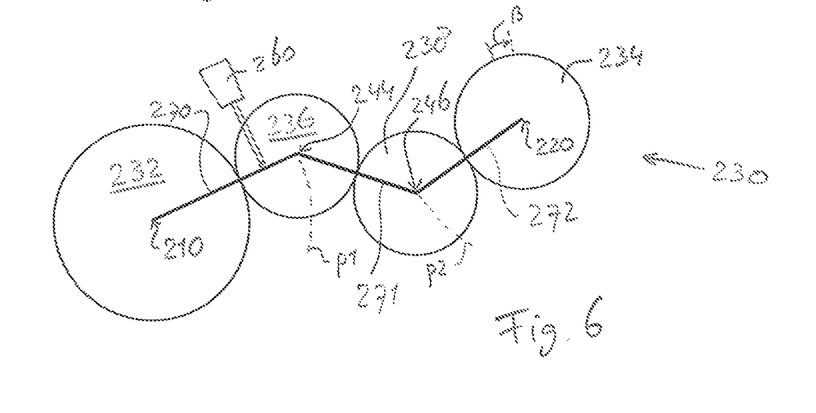
FIG. 6 shows a highly diagrammatic top view of a portion of a transmission device of a system according to the present invention.

FIG. 6 shows four gear wheels 232, 234, 236 and 238 of the transmission device 230. A first gear wheel 232 may replace an above-described gear wheel 32 or 132 and is rotatable about a central axis 210, similar to central axes 10 and 110. A second gear wheel 234 may replace an above-described gear wheel 34 or 134 and is rotatable about a central axis 220, similar to central axes 20 and 120. The first 232 and second 234 gear wheel can only rotate and can thus not move differently, analogous to gear wheels 32, 132 and 34, 134. The transmission device 230 furthermore has a first transmission gear wheel 236 which is rotatable about a third central axis 244 and a second transmission gear wheel 238 which is rotatable about a fourth central axis 246. This first 236 and second 238 transmission gear wheel are displaceable at right angles to central axes 210, 244, 246 and 220, or in the plane of the drawing from FIG. 4, with the centres, which coincide with the centres of gravity, of the transmission gear wheels 236, 238 being displaced. To this end, coupling rods are provided. A first coupling rod 270 connects the axle, with central axis 210, of the first gear wheel 232, to the axle, with central axis 244, of the first transmission gear wheel 236. As a result thereof, the first transmission gear wheel 236 can be displaced according to a circular arch, a portion of which is denoted as p1 in FIG. 6. In this case, gear wheels 232 and 236 remain in engagement. The same is true for a second coupling rod 272 between axles of the second gear wheel 234 and the second transmission gear wheel 238. The second transmission gear wheel 238 can thus be displaced along a circular arch p2 which is partly illustrated in FIG. 6. The two transmission gear wheels 236 and 238 are also connected to each other by a coupling rod 271. As a result of the mechanism of coupling rods 270, 271 and 272, it is possible to displace the first 236 and second 238 transmission gear wheels in the plane of the gear wheels while maintaining toothed engagement. By suitably choosing the diameters of the gear wheels and the distance between central axes 210 and 220, it is possible, when imposing a displacement, according to arcuate path p1, to gear wheel 236, that the second gear wheel 234 will undergo an angular displacement which differs from that of the first gear wheel 232, as a result of which an angular position of the second gear wheel 234 changes with respect to an angular position of the first gear wheel 232, such as by an illustrated angle β. In this case, it should be noted that the dimensions of the illustrated gear wheels and the illustrated angle β are purely illustrative and do not have to be to scale/in proportion.

For the purpose of said displacement, the transmission device 230 has a displacement device 260 which is configured for displacing, while maintaining engagement between the first 236 and the second 238 transmission gear wheels, the first 236 and the second 238 transmission gear wheel with respect to each other in a plane at right angles to the extending direction of the third 244 and fourth 246 central axes, by means of imposing a displacement, being a pivoting movement about central axis 210, of coupling rod 270. The displacement device 260 may comprise, for example, a linear actuator. During said displacement, the first transmission gear wheel 236 follows a circular path with a constant first radius around the first central axis, along path p1, and the second transmission gear wheel 238 follows a circular path with a constant second radius around the second central axis 220, along path p2, during said displacement. Analogously to the displacement device 60 described above in the context of systems 1, 100, the displacement device 260 may be operated manually and/or automatically, such as by means of a detection device, for example comprising detectors, such as sensors 66, 68, for detecting an angular position of circulating elements or components of the system rotating therewith at a fixed transmission ratio.

According to the invention, a method is provided for adjusting a mutual position of product carriers of a system according to the present invention, such as systems 1, 100 described with reference to the figures and the systems according to the invention comprising the transmission device 230. The method comprises displacing at least one of the first 36, 236 and second 38, 238 transmission gear wheels using the displacement device 60, 260 while maintaining toothed engagement, in order to change an angular position of the first gear wheel 32, 232 with respect to an angular position of the second gear wheel 34, 234 as a result of the displacement, which displacement is such that the centre of gravity of the at least one of the first and second transmission gear wheels is displaced. This may take place during operation of the system. The method thus furthermore comprises allowing the first and the second circulating elements to rotate.

Using a detection device which is configured for the purpose, such as for example the above-described detection devices, a mutual positioning of a first and a second product carrier is detected, directly or via a detection of a mutual positioning of the first and second circulating elements or for example of the first and second gear wheels. The method furthermore comprises, if the detected mutual positioning is outside a predetermined range, for example is greater than 10 mm, or an angular position difference (i.e. the position deviation) associated therewith in a range, by way of example, of −10 to 10 mm, carrying out the displacement step of the first and/or second transmission gear wheel during the rotation, in order to ensure that the mutual positioning is again within the predetermined range. The detection device may be operatively connected to the displacement device, wherein a control device of the system is configured to actuate the displacement device on the basis of a signal from the detection device.

In addition or alternatively to the abovementioned detection, in an embodiment of the method, the displacement step is carried out on the basis of a weight of the slaughtered products which is preferably input in a control device of the system manually or on the basis of a weight measurement in the system, as has already been explained in more detail above, in order thus to ensure that the mutual positioning is again within a predetermined range.

The invention claimed is:

1. A system for processing slaughtered products comprising poultry, the system comprising:
   a first circulating element which rotates about a first central axis during operation of the system;
   first product carriers which cooperate with the first circulating element for joint rotation, each configured to carry a respective one of the slaughtered products;
   a second circulating element which, during operation, rotates about a second central axis, which is parallel and spaced apart from the first central axis;
   second product carriers which cooperate with the second circulating element for joint rotation, each configured to carry a respective one of the slaughtered products; and
   a transmission device which is configured for coupling the first and second circulating element to each other using a fixed transmission ratio, in such a way that upon rotation of the first circulating element in a direction of rotation, the second circulating element rotates in the opposite direction of rotation, and in such a way that during said rotation in each case a first product carrier and a second product carrier pass a transfer location at the same time interval with respect to each other, wherein the system is configured to transfer a slaughtered product from a first product carrier to a second product carrier during said rotation at the location of the transfer location, the transmission device comprising:
- a first gear wheel and a second gear wheel connected to the first and the second circulating element, respectively, for rotation,
- a first transmission gear wheel and a second transmission gear wheel which is in toothed engagement with the first transmission gear wheel, wherein the first gear wheel is coupled to the second gear wheel via the first transmission gear wheel and the second transmission gear wheel for rotation, and
- a displacement device which is adapted to displace the centre of gravity of at least one of the first transmission gear wheel and the second transmission gear wheel while maintaining the toothed engagement, in such a way that an angular position of the first gear wheel changes with respect to an angular position of the second gear wheel.

2. The system according to claim 1, wherein the first product carriers are attached to the first circulating element at a regular distance apart in the peripheral direction, and wherein the system comprises an endless flexible conveying member on which the second product carriers are provided at a regular distance apart and which is fitted around the second circulating element.

3. The system according to claim 1, further comprising:
- a first endless flexible conveying member, on which the first product carriers are provided at a regular distance apart and which is fitted around the first circulating element, and/or
- a second endless flexible conveying member, on which the second product carriers are provided at a regular distance apart and which is fitted around the second circulating element.

4. The system according to claim 1, wherein the first gear wheel and the second gear wheel each have a central axis which coincides with the first and the second central axis, respectively.

5. The system according to claim 1,
wherein the first transmission gear wheel is provided with inclined toothing and is rotatable about a third central axis and wherein the second transmission gear wheel is also provided with inclined toothing, is in toothed engagement with the inclined toothing of the first transmission gear wheel, and is rotatable about a fourth central axis,
wherein the displacement device of the transmission device is configured to displace one of the first and second transmission gear wheel with respect to the other of the first and second transmission gear wheel parallel to the central axis thereof while maintaining the engagement between the first and second transmission gear wheel.

6. The system according to claim 5, wherein the transmission device furthermore comprises:
- a third transmission gear wheel which is rotatable about the third central axis, is non-rotatably connected to the first transmission gear wheel and is coupled to the first gear wheel at a fixed transmission ratio, and comprises

- a fourth transmission gear wheel which is rotatable about the fourth central axis, is non-rotatably connected to the second transmission gear wheel and is coupled to the second gear wheel at a fixed transmission ratio,
wherein the displacement device is configured to displace the first and the, or with respect to the, third transmission gear wheel parallel to the third central axis and/or to displace the second and the, or with respect to the, fourth transmission gear wheel parallel to the fourth central axis.

7. The system according to claim 6, wherein the first, second, third and fourth central axes all extend parallel to each other.

8. The system according to claim 1,
wherein the first transmission gear wheel is rotatable about a third central axis and wherein the second transmission gear wheel is rotatable about a fourth central axis which runs parallel and at a distance from the third central axis,
wherein the displacement device of the transmission device is configured to displace the first and the second transmission gear wheels with respect to each other in a plane at right angles to the third and fourth central axes while maintaining engagement between the first and the second transmission gear wheels.

9. The system according to claim 8, wherein the first transmission gear wheel follows a circular path with a constant first radius around a central axis of the first gear wheel during said displacement, and wherein the second transmission gear wheel follows a circular path with a constant second radius around a central axis of the second gear wheel during said displacement.

10. The system according to claim 1, wherein the first product carriers are of a different type than the second product carriers.

11. The system according to claim 1, wherein the system, in order to allow a slaughtered product to be transferred from a first product carrier to a second product carrier, comprises a transfer means which is configured to allow a slaughtered product to be transferred at the location of the transfer location, during said rotation, from a first product carrier to a second product carrier, by a transfer element of the transfer means exerting a force on the slaughtered product.

12. The system according to claim 1, comprising a drive device for effecting rotation about the respective central axis of the first and/or the second circulating element.

13. A method for adjusting a mutual positioning of product carriers of a system according to claim 1, the method comprising:
displacing the centre of gravity of at least one of the first transmission gear wheel and the second transmission gear wheel using the displacement device while maintaining the toothed engagement, in such a way that an angular position of the first gear wheel with respect to an angular position of the second gear wheel changes.

14. The method according to claim 13, further comprising
allowing the first and the second circulating element to rotate, detecting a mutual positioning of a first and a second product carrier, and
if the detected mutual positioning is outside a predetermined range, carrying out the displacement step during rotation in order for the mutual positioning to fall within the predetermined range again.

* * * * *